US009560128B2

(12) United States Patent
Novak et al.

(10) Patent No.: US 9,560,128 B2
(45) Date of Patent: Jan. 31, 2017

(54) SHARING A FILE THROUGH A METADATA REPRESENTATION OF THE FILE

(71) Applicant: Microsoft Technology Licensing, LLC, Redmond, WA (US)

(72) Inventors: Michael John Novak, Redmond, WA (US); Dileep Kumar, Redmond, WA (US); Gerald Haslhofer, Bellevue, WA (US); Yu Fan Vincent Chen, Redmond, WA (US); Shrey Shah, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 145 days.

(21) Appl. No.: 14/333,025

(22) Filed: Jul. 16, 2014

(65) Prior Publication Data
US 2016/0021175 A1    Jan. 21, 2016

(51) Int. Cl.
*G06F 13/00* (2006.01)
*H04L 29/08* (2006.01)
*H04L 29/06* (2006.01)

(52) U.S. Cl.
CPC ............ *H04L 67/104* (2013.01); *H04L 67/06* (2013.01); *H04L 67/2804* (2013.01); *H04L 67/42* (2013.01); *H04L 69/04* (2013.01)

(58) Field of Classification Search
CPC ............... H04L 29/08072; H04L 29/06; H04L 29/0809; H04L 29/06047; H04L 67/104; H04L 67/06; H04L 67/2804; H04L 69/04; G06Q 30/02; G06Q 10/10; G06F 17/30286; G06F 17/30595; G06F 17/30067

USPC .......................................... 707/803; 709/203
See application file for complete search history.

(56) References Cited

U.S. PATENT DOCUMENTS

| 7,315,386 | B1 | 1/2008 | Shiimori et al. |
| 8,484,260 | B2 | 7/2013 | Caso et al. |
| 8,527,646 | B2 | 9/2013 | Khatib et al. |
| 8,578,076 | B2 | 11/2013 | Linden et al. |
| 2006/0161635 | A1 | 7/2006 | Lamkin et al. |

(Continued)

FOREIGN PATENT DOCUMENTS

EP        2288114 A2    2/2011

OTHER PUBLICATIONS

Strauss, et al., "Device Transparency: a New Model for Mobile Storage", In Proceedings of the ACM SIGOPS Operating Systems Review, vol. 44 Issue 1, Jan. 2010, 6 pages.

(Continued)

*Primary Examiner* — Robert B Harrell
(74) *Attorney, Agent, or Firm* — Bryan Webster; Daniel Choi; Micky Minhas

(57) ABSTRACT

The use of logic for routing data. Metadata that is associated with data residing on a first computing system is sent to at least a second computing system. The metadata is structured so that when interpreted by the second system, the second system provides an appearance that the data is local. The first system then receives a communication from the second computing system, demonstrating that a user has interacted with the appearance of data on the second system. Logic may be applied to determine how and when to send the data to the second system. Based on the determination made by applying logic, the data is sent to the second system in a manner that is associated with the identifier for the entire data.

20 Claims, 6 Drawing Sheets

(56) References Cited

U.S. PATENT DOCUMENTS

| | | |
|---|---|---|
| 2011/0047190 A1* | 2/2011 | Lee .................... H04L 67/1095 707/803 |
| 2012/0166516 A1 | 6/2012 | Simmons et al. |
| 2013/0311986 A1 | 11/2013 | Arrouye et al. |

OTHER PUBLICATIONS

Akmal, Mona, "Have all your SkyDrive files with you—without using all your storage or bandwidth", Published on: Jul. 22, 2013, Available at: http://blog.onedrive.com/have-all-your-skydrive-files-with-you-without-using-all-your-storage-or-bandwidth/.

Wagner, Kyle, "The New SkyDrive Might Be the Best Cloud Storage Yet", Published on: Jul. 22, 2013, Available at: http://gizmodo.com/the-new-skydrive-might-be-the-best-cloud-storage-yet-863771582.

"Lima: the brain of your devices", Published on: Jul. 14, 2013, Available at: https://www.kickstarter.com/projects/cloud-guys/plug-the-brain-of-your-devices.

"International Search Report & Written Opinion Issued in PCT Application No. PCT/US2015/040082", Mailed Date: Oct. 13, 2015, 16 Pages.

"Second Written Opinion Issued in PCT Application No. PCT/US2015/040082", Mailed date: Jun. 6, 2016, 4 Pages.

"International Preliminary Report on Patentability Issued in PCT Application No. PCT/US2015/040082", Mailed Date: Oct. 12, 2016, 8 Pages.

* cited by examiner

SHARING A FILE THROUGH A METADATA REPRESENTATION OF THE FILE

BACKGROUND

Computing systems and related technology affect many aspects of society. Indeed, the computing system's ability to process information has transformed the way we live and work. Computing systems now commonly perform a host of tasks (e.g., word processing, scheduling, accounting, and so forth) that prior to the advent of the computing system were performed manually. More recently, computing systems have been coupled to one another and to other electronic devices, such as phones and tablets, to form both wired and wireless computer networks over which the computing systems and other electronic devices can transfer electronic data.

Many times, a number of desktop computers, laptop computers, phones, tablets, and so forth are coupled to one another within a cloud-based service/network. For example, a family with a desktop computer, a tablet and smartphones for individual members of the family, may couple each one of those devices through a cloud-based service/network. The cloud-based service/network may then allow individual family members to access documents, photos, videos, and such that are created on one another's devices.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY

At least some embodiments described herein relate to the use of logic for routing data, derived versions of data, and data transformations. In some embodiments, metadata that is associated with data residing on a first computing system is sent to at least a second computing system. The metadata is structured so that when interpreted by the second computing system, the second computing system provides an appearance that the data is locally present. The first computing system then receives a communication from the second computing system, demonstrating that a user has interacted with the appearance of data on the second computing system. In response to that communication, the first computing system then sends a transformation of the data to at least the second computing system. Other embodiments take the view of the second computing system which interprets the metadata to provide the appearance that the data is locally present, detects that the user interacted with the appearance, and as a result requests at least a transformation of the data from the first computing system.

In other embodiments, metadata that includes an identifier and is associated with data residing on a first computing system is sent to at least a second computing system. Logic is then applied to determine how and when to send a derived version of the data to at least the second computing system. Based on the determination made by applying logic, the derived version of the data is sent to at least the second computing system in a manner that is associated with the identifier for the entire data.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
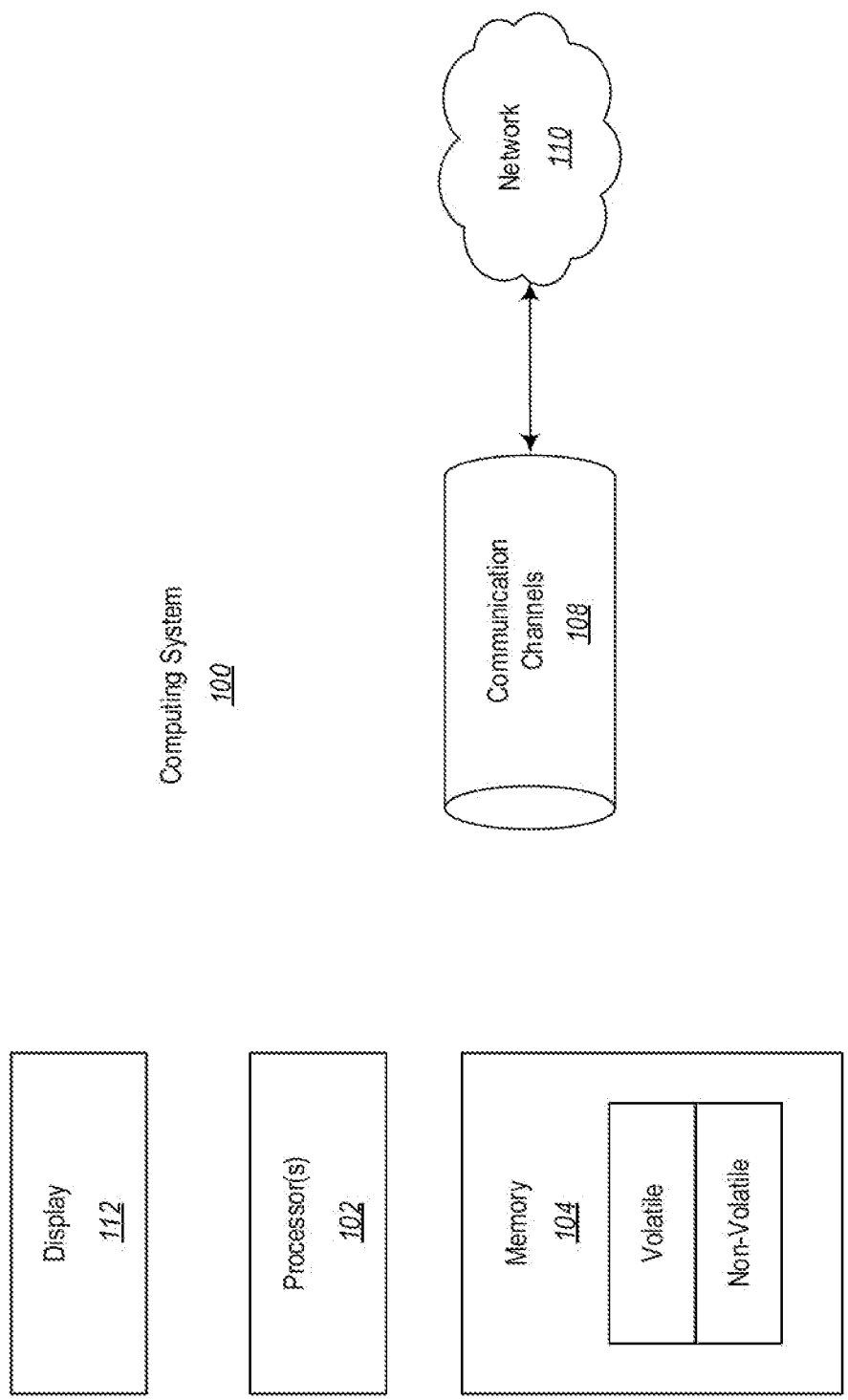
FIG. 1 illustrates an example computing system in which the principles described herein may operate.

At least some embodiments described herein relate to the use of logic for routing data, derived versions of data, and data transformations. For instance, logic may be based on a user's habits, availability of bandwidth, user preferences, and so forth. For example, the logic used may include a delay for a specified period of time based on past user interaction with similar types of data before sending a derived version of that data. The delay may be the average time a user takes to discard unwanted digital pictures and edit wanted digital pictures. The logic used may also update dynamically according to a user's preferences.

In some embodiments, metadata that is associated with data residing on a first computing system is sent to at least a second computing system. The metadata is structured so that when interpreted by the second computing system, the second computing system provides an appearance that the data is locally present. The first computing system then receives a communication from the second computing system, demonstrating that a user has interacted with the appearance of data on the second computing system. In response to that communication, the first computing system then sends a transformation of the data to at least the second computing system. Other embodiments take the view of the second computing system which interprets the metadata to provide the appearance that the data is locally present, detects that the user interacted with the appearance, and as a result requests at least a transformation of the data from the first computing system.

In other embodiments, metadata that includes an identifier and is associated with data residing on a first computing system is sent to at least a second computing system. Logic is then applied to determine how and when to send a derived version of the data to at least the second computing system. Based on the determination made by applying logic, the derived version of the data is sent to at least the second computing system in a manner that is associated with the identifier for the entire data.

Although the subject matter is described in language specific to structural features and/or methodological acts, it is to be understood that the subject matter defined in the appended claims is not necessarily limited to the described features or acts described herein, or the order of the acts described herein. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor.

FIG. 1 illustrates an example computing system 100. In its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

Each of the computing systems described herein may be connected to one another over (or may be part of) a network, such as, for example, a Local Area Network ("LAN"), a Wide Area Network ("WAN"), and even the Internet. Accordingly, each of the described computing systems as well as any other connected computing systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 110 may also have a display 112 to display user interfaces to a user, and of course an associated input device (not shown) if the user is to input data into the computing system.

Embodiments described herein may comprise or utilize a special-purpose or general-purpose computing system that includes computer hardware, such as, for example, one or more processors and system memory, as discussed in greater detail below. The system memory may be included within the overall memory 104. The system memory may also be referred to as "main memory", and includes memory locations that are addressable by the at least one processing unit 102 over a memory bus in which case the address location is asserted on the memory bus itself. System memory has traditionally been volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computing system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media includes recordable-type storage devices, such as RAM, ROM, EEPROM, solid state drives ("SSDs"), flash memory, phase-change memory ("PCM"), optical disk storage, magnetic disk storage or other magnetic storage devices, or any other physical hardware storage medium(s) which can be used to store program code in the form of computer-executable instructions or data structures, and which can be accessed and executed by a general-purpose or special-purpose computing system to implement the functionality described herein.

Transmission media can include a network and/or data links which can be used to carry program code in the form of computer-executable instructions or data structures, and which can be accessed by a general-purpose or special-purpose computing system. A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system may view the connection as transmission media. Combinations of the above should also be included within the scope of computer-readable media.

Further, upon reaching various computing system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computing system RAM and/or to less volatile computer storage media at a computing system. Thus, it should be understood that computer storage media can be included in computing system components that also (or even primarily) utilize transmission media.

Computer-executable instructions comprise, for example, instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, wearables (e.g., smartwatches), PDAs, tablets, pagers, routers, switches, and the like. The invention may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
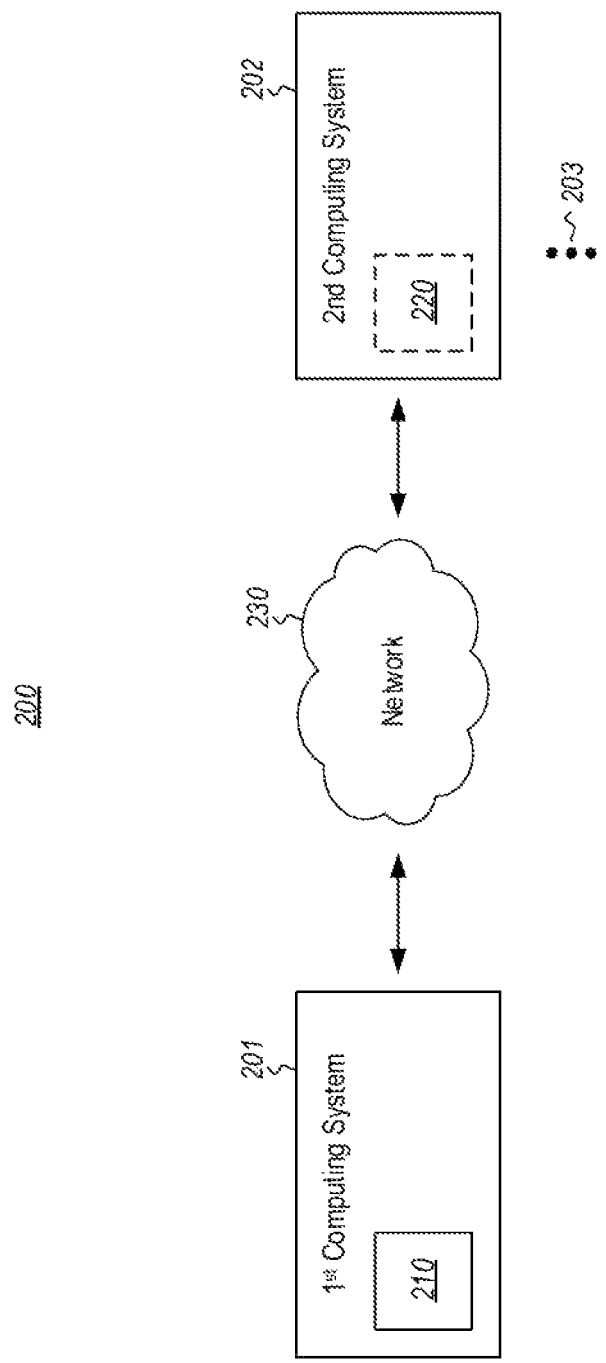
FIG. 2 illustrates an environment for making data generated at a first computing system available to computing systems available over a network through virtual representations of the generated data.

FIG. 2 illustrates computing system environment 200 in accordance with the principles described herein. The environment 200 includes a first computing system 201, a second computing system 202 and a network 220 interposed between the first and second computing systems. The first computing system 201 is illustrates as storing data 210. The second computing system 202 is shown storing data 220. The network 230 allows the connection of at least computing systems 201 and 202 through any means described herein. The ellipsis 203 represents any number of additional computing systems connected to computing systems 201 and 202 via network 230. Both computing system 201 and computing system 202 (as well as any number of additional computing systems represented by ellipsis 203) are examples of computing system 100.

Data 210 can be any type of data interpretable by a computing system. For example, data 210 may be a digital picture (e.g., a jpg or bmp file), a document (e.g., a txt or doc file), digital audio (e.g., an mp3 file), video file, or any other type of data. Similarly, data 210 may be a single file (e.g., a digital picture, a .doc, a .pdf., and so forth) or may be numerous files (e.g., 2 Gigabytes of digital pictures, a folder, or the like). The data 210 might also be streaming data. Data 220, represented by a rectangle with dotted lines, can be any type of data associated with data 210. For instance, data 220 may be metadata associated with data 210, a derived version of data 210, a transformation of data 210, the entire data 210, and so forth.

Figure 3:
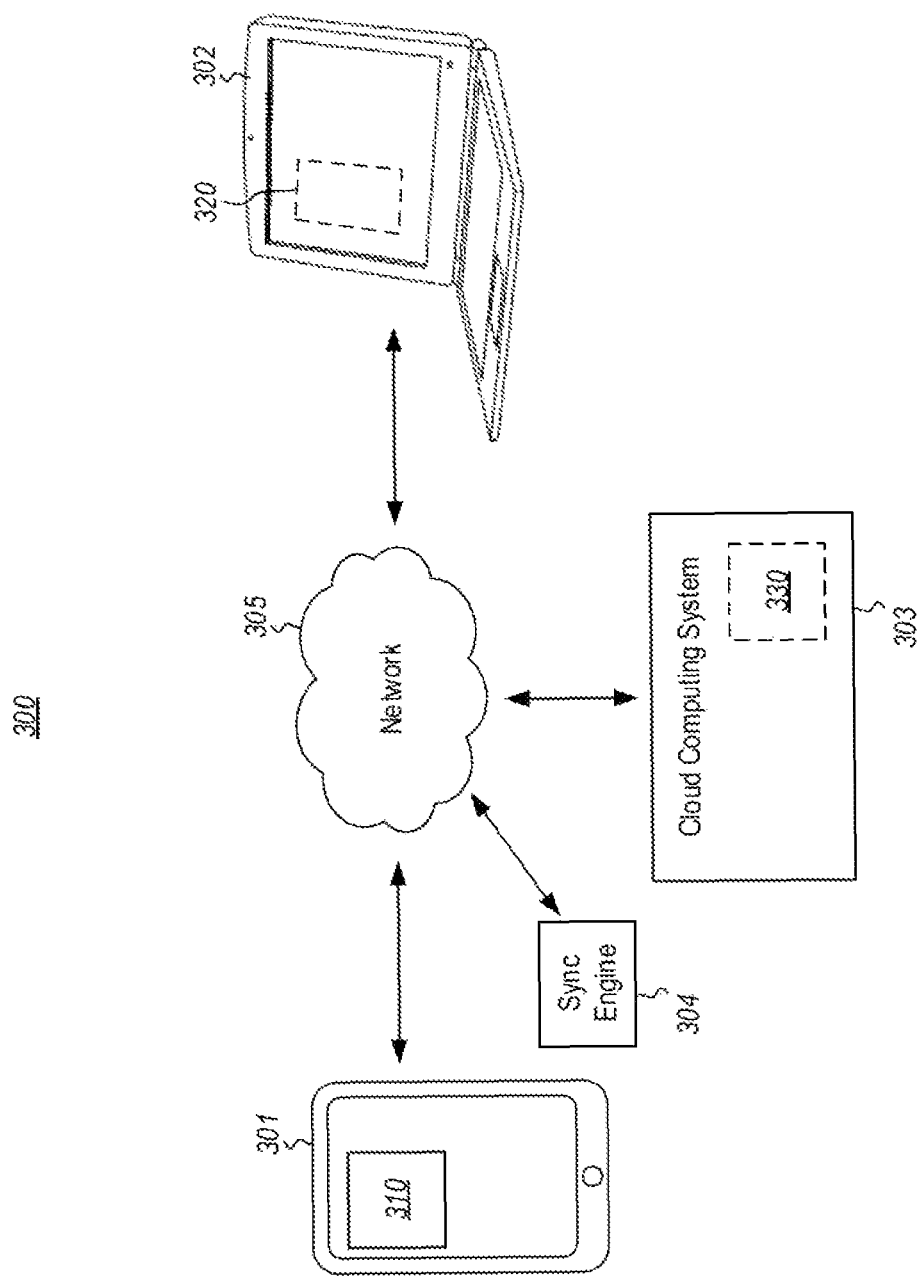
FIG. 3 illustrates a specific example of a computing environment for making data generated at a first computing system available over a network to computing systems through virtual representations of the generated data.

FIG. 3 illustrates a more specific example of a computing environment 300 for practicing the principles described herein and will be described with respect to the computing environment 200 of FIG. 2. Environment 300 includes a smartphone 301, a laptop 302, a cloud computing system 303, a sync engine 304, and a network 305 allowing all of these to communicate. The smartphone 301 is shown storing data 310. The laptop 302 is shown storing data 320. The cloud computing system 303 is shown storing data 330. The sync engine 304 allows synchronizing of data or transformations thereof in a manner that will be described in further detail below. Network 305, allows for the connection of all the computing systems shown in environment 300. It should be noted that, as demonstrated by ellipsis 203 in FIG. 2, there may be any number of computing systems connected through network 305. Similarly, the computing systems shown may be of any type known in the art and/or described herein (e.g., smartphones, tablets, desktop computers, laptop computers, cloud computing systems, cameras and so forth).

As the methods described in the flow charts of FIGS. 4 through 6 may be performed in the environment 300, those methods will be described with frequent reference to FIG. 3. Throughout FIGS. 4 through 6, acts that are performed by a first computing system (such as the first computing system 201 of FIG. 2, or the computing system 301 of FIG. 3) will be listed in the left column of each figure under the heading "1$^{st}$ Computing System". On the other hand, acts that are performed by a second computing system (such as the second computing system 202 of FIG. 2, or the computing system 302 of FIG. 3) will be listed in the right column of each figure under the heading "2$^{nd}$ Computing System". Acts that are associated with the initial synchronization of the data (or a transformation thereof) from the first computing system to the second computing system are illustrated in solid-lined boxes. Acts that are associated with subsequent editing of the data (or the transformation thereof) by the second computing system are illustrated in dashed-lined boxes.

Figure 4:
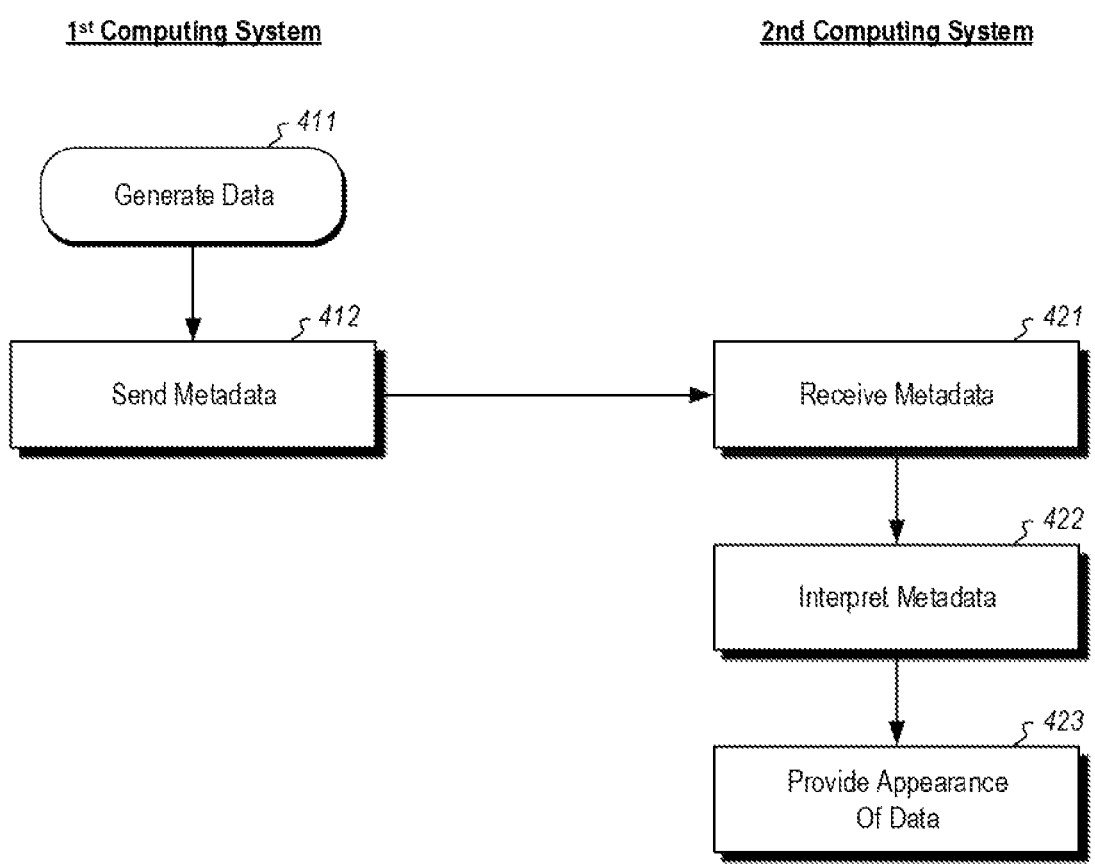
FIG. 4 illustrates a flowchart of a method for using metadata to prepare to make at least a portion of data that resides on a first computing system available on other computing systems over a network.
Figure 5:
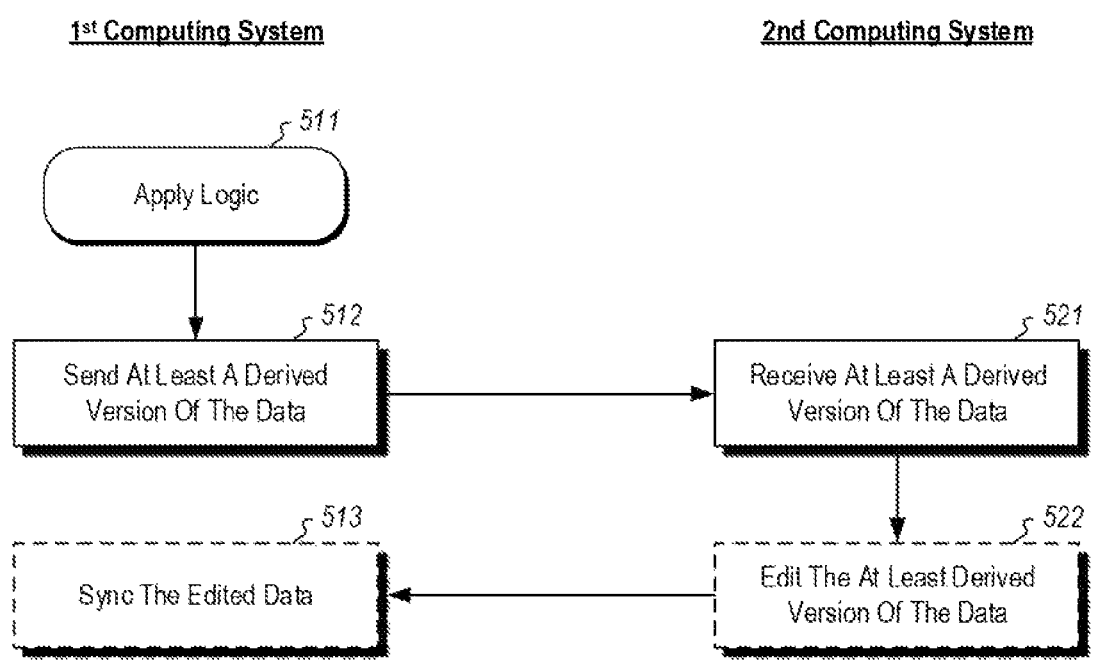
FIG. 5 illustrates a flow chart of a method for using logic to send at least a transformation of data to at least a second computing system.
Figure 6:
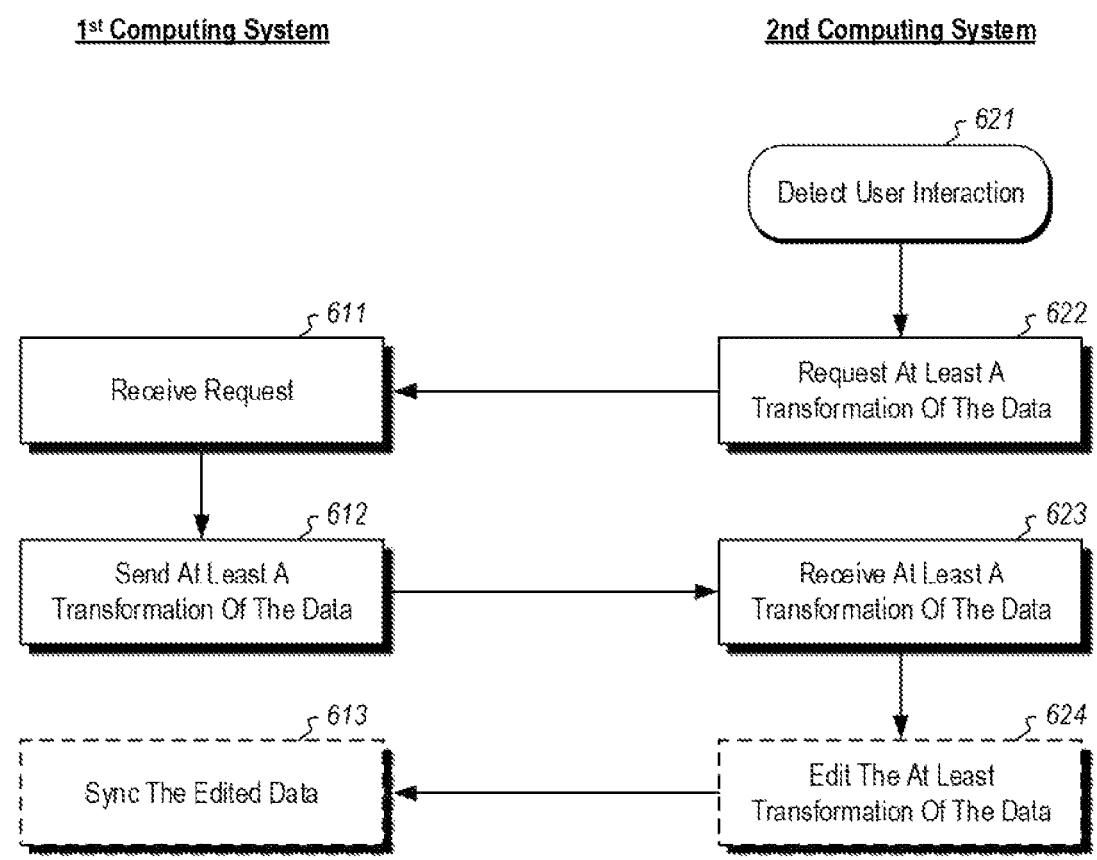
FIG. 6 illustrates a flow chart of a specific example of logic that can be applied to determine when at least a derived version of data should be sent to a second computing system.

Throughout FIGS. 4 through 6, to illustrate the principles described herein, a particular scenario will now be outlined and used throughout this description. In this scenario, a group of users all subscribe to a cloud computing service that provides a medium for each user's devices (computing systems) to share data and communicate with one another.

FIG. 4 illustrates a flowchart of a method 400 for using metadata to prepare to make at least a portion of data that resides on a first computing system available on other computing systems in the same network. The method 400 begins when one of the users generates data on a first computing system in the network (act 411). In the ongoing scenario, the data generation may occur when one of the users takes a digital picture 310 using smartphone 301. In some embodiments, the first computing system may comprise a distributed computing system, such as smartphone 301 in conjunction with cloud computing system 303. In other embodiments, the first computing system may be a single computing system, such as smartphone 301. It should also be noted that any of the computing systems in the network may be considered the "first computing system" in cases where data is generated on that particular computing system.

Once the data is generated, sync engine 304 may recognize the newly generated data 310 and proceed to edit and add additional information to the metadata 320, 330 of the data. The additional information may include an identifier that allows any computing system in the network to identify the location of data 310, retrieve data 310 from the location, and display data 310 (e.g., IP address, source path, file size, and so forth).

Similarly, the additional information may include an interpretation of already included metadata. For example, a digital picture taken on July 4$^{th}$ may be interpreted as having been taken on Independence Day. In other embodiments, interpretations of already included metadata may include the location where the data was generated (e.g., a picture taken near 400 Broad St. in Seattle, Wash., U.S.A may be interpreted as being taken at the Space Needle), the time the data was generated (e.g., a picture taken at 10:00 a.m. on December 25$^{th}$ may be interpreted as being taken on Christmas morning), and so forth.

Metadata 320, 330 may be structured in such a way that when it is received and interpreted by a computing system in the network, the interpretation of the metadata shows up as an appearance of data 310. In other words, once a second computing system has received the metadata it will appear to an end user as if data 310 resides locally on the second computing system.

Sync engine 304 may comprise hardware, software, or a combination of the two. Likewise, sync engine 304 may include components that reside on a single computing system or that are distributed across multiple computing systems. For instance, sync engine 304 may reside solely on cloud computing system 303 or a client computing system 301/302. In other embodiments, sync engine 304 may be distributed between cloud computing system 303 and client computing systems 301, 302.

Once the sync engine has recognized the generated data and added the additional information to the metadata, as described above, the metadata is sent to at least a second computing system (act 412). Generally, the metadata will be sent to each computing system in the network. In the ongoing example, metadata 320, 330 associated with digital picture 310 may be sent from smartphone 301 to both laptop 302 and cloud computing system 303.

In some embodiments, sync engine 304 may alert cloud computing system 303 of the generated data, which results in the cloud computing system pulling the metadata from smartphone 301 and then acting as a medium to send the metadata to all computing systems in the network. In other embodiments, smartphone 301 may push the metadata to the other computing systems in the network through cloud computing system 303, peer-to-peer connections, or any other suitable method of communication. In yet other embodiments, sync engine 304 may alert at least a second computing system in the network of the newly generated data, resulting in at least the second computing system pulling the metadata from the first computing system.

After the metadata has been sent, at least a second computing system will receive the metadata (act 421). For instance, the second computing system may be laptop 302, which receives metadata 320 that is associated with digital picture 310.

Once the metadata has been received, the second computing system then interprets the metadata (act 422). As described above, the metadata is structured in such a way that once it has been interpreted by the second computing system, the data appears to reside locally on the second computing system (act 423). In the ongoing example, laptop 302 may receive and interpret metadata 320 that is associated with digital picture 310. The interpreted metadata 320 may then appear to an end user of laptop 302 as a thumbnail that looks as if it were a locally stored (i.e., locally stored on laptop 302) copy of digital picture 310. In some embodiments, the appearance of interpreted metadata may appear as a thumbnail, an icon, a folder, a file name, or any other suitable representation/appearance of data.

FIG. 5 illustrates a method 500 for using logic to send at least a transformation of data to at least a second computing system after the metadata of FIG. 4 has been sent. Once the metadata has been sent, logic is applied at the first computing system to determine when to send at least a derived version of the generated data to at least a second computing system (act 511). It should be noted that the derived version of data 310, like the metadata, may be represented by blocks 320 and 330 of computing systems 302 and 303, respectively. A derived version 320, 330 of data 310 may be as much as the entire data 310, as little as just metadata of the data 310, or anything in between.

In some embodiments, the logic applied may dynamically update according to a user's preferences. In other embodiments, the logic applied may comprise a delay before sending at least a derived version 320 of the data 310 for a specific time period based on the specific user's past interaction with similar types of data. For example, in the ongoing scenario, the logic applied may comprise a delay before sending at least a derived version 320 of data 310, that takes into consideration the average time the particular user (i.e., the user who took digital picture 310) takes to discard unwanted digital pictures and edit wanted digital pictures. In this manner, the system may avoid synching digital pictures that have not yet been subject to the usual initial deletion for selection of the best digital pictures. As discussed previously, it should be noted that data 310 may also include numerous data files, such as a folder of digital pictures.

In some embodiments, the logic applied may determine that the first computing system 301 should push at least a derived version 320 of data 310 to at least a second computing system 302. Alternatively, the logic applied may determine that a second computing system 302 should pull at least a derived version 320 of data 310 from the first computing system 301. The derived version may be pulled/fetched using any suitable protocol (e.g., HTTP, FTP, SMB, web service calls, and so forth). In other embodiments, the second computing system may utilize cloud computing system 303 as a medium for fetching the derived version 320 of data 310.

In some embodiments, an end user that generates data 310 may be able to tag the data with a level of importance. For instance, an end user may create a document that is urgent for someone/everyone in the network to receive, and therefore may tag the document as being very important/urgent. The logic applied may comprise rules that depend on the size of the data generated, the type of the data generated, which user generated the data, the location where the data was generated (e.g., the device where the data was generated, the folder where the data was generated, and so forth), the particular user's habits, whether the user is on Wi-Fi, whether the user is using a paid network data plan, available resources (e.g., network availability, bandwidth, and so forth), the importance of the type of data, or any other suitable logic rules. Similarly, the logic applied may dynamically update in accordance with any of the factors described herein.

In response to the application of the logic, the first computing system then sends at least a derived version of data to the second computing system in a manner that is associated with the identifier for the entire data (act 512). In some embodiments, the manner associated with the identifier for the entire data comprises the derived version 320 of data 310 being included in the same transmission as the metadata. In other embodiments, the manner associated with the identifier for the entire data comprises the sync engine 304 adding additional information to the derived version 320 of data 310, which may allow a second computing system to identify the location of the entire data 310.

In some embodiments, the derived version 320 of data 310 is a transformation of the entire data. A transformation of the data may comprise a thumbnail that allows a user to preview the data. In other embodiments, a transformation may comprise a digital picture with a lower resolution than the original digital picture with which the transformation is associated. In yet other embodiments, a transformation may comprise text that is recognized within, and extracted from, the original data. For example, the original data 310 may be a MICROSOFT® POWERPOINT® presentation and the transformation 320 may comprise key words that have been recognized and extracted from the POWERPOINT, thus making the POWERPOINT searchable. This may allow an end user to search for data 310 locally (i.e., without using network 305 to communicate with other computing systems in the network) and still be able to identify the location (i.e., computing system) where the POWERPOINT resides.

Similarly, a derived version/transformation 320 of data 310 may be an augmentation of the data, which includes additional data that is formulated through an evaluation of the data 310. The evaluations of data 310 may be calculated at the first computing system, at a second computing system in the network, or may be distributed between more than one computing system in the network. An augmentation may comprise inferential data, which data is estimated to be true based on the evaluation of data 310, but which is not certain to be true based on the evaluation of the data 310. For instance, inferential data may comprise an estimated identification of an individual in a digital picture or an estimated landmark that an individual was facing when a digital picture was taken. Inferential data may also comprise estimated temperature, geolocation, time, optical character recognition, product recognition, and so forth.

It should be noted that any of the embodiments used herein to describe the transformations/derived versions of data may be equally applicable to the metadata described herein. Similarly, any of the embodiments used herein to describe the metadata may likewise be understood to apply to the transformations/derived versions of data. For example, the metadata may include augmentations similar to those described above regarding transformations/derived versions of data.

The second computing system then receives the sent derived version of the entire data (act 521). In the ongoing example, for instance, the derived version 320 may be a lower resolution digital picture than the original digital picture 310. In some embodiments, the derived version of data may not be similar enough to the entire data to satisfy an end user's needs, in which case the user may then fetch the entire data. For instance, an end user may fetch a full resolution digital picture 310 after having received a lower resolution digital picture 320, which does not satisfy the end user's needs. The protocol used to fetch data 310 may be HTTP, FTP, SMB, web service calls, or any other suitable protocol. While the derived version 320 was just described as a lower resolution digital picture, it may be in any form described above.

The derived version 320 may also allow a user the optional step of using, manipulating, or editing the derived version of data (act 522). In the ongoing example, an end user may use a filter to edit the lower resolution digital picture 320 at laptop 302. Editing/manipulating a derived version 320 of data 310 may be of any type suitable for the type of data received (e.g., editing the text of a text document, cropping a digital picture, making a pdf searchable, and so forth).

Once an edit has been made to the derived version of data on the second computing system, the edited data is synced back to the first computing system (act 513). While the act of syncing is shown in FIG. 5 as being performed on the first computing system, syncing may be done by any of the computing systems in the network, either singly or in a distributed manner. In some embodiments, sync engine 304 may recognize that an edit has occurred on the second computing system and proceed to sync the edited data back to the first computing system. In other embodiments, cloud computing system 303 may act as a proxy to sync any edits made on a computing system in the network back to the first computing system where the data was originally generated, as well as syncing to any other applicable computing systems in the network.

FIG. 6 illustrates a specific example of logic that can be applied to determine when at least a derived version of data should be sent to the second computing system. More specifically, FIG. 6 illustrates a method 600 for applying logic that comprises determining that a transformation of the data is to be sent in response to user interaction with the appearance of the data described in method 400 of FIG. 4.

The method 600 begins when user interaction with the metadata/appearance of the entire data (described in method 400) on the second computing system is detected at the second computing system (act 621). In the ongoing scenario, for example, laptop 302 may detect that a user tried to open thumbnail 320 of digital picture 310 on the laptop. In response to the detection of the user interaction, the second computing system then requests at least a transformation of the entire data from the first computing system (act 622).

The first computing system then receives a communication from the second computing system that is indicative of a user having interacted with the appearance of the entire data (act 611). For instance, the first computing system may receive a communication demonstrating that an end user of laptop 302 tried to open thumbnail 320, which is associated with digital picture 310 that resides on smartphone 301. In response to receiving the communication, the first computing system then sends at least a transformation of data 310 to the second computing system (act 612).

In response to the request, the second computing system then receives at least a transformation of the entire data from the first computing system (act 623). In the ongoing example, for instance, the transformation 320 may be only a slightly lower resolution digital picture than the original digital picture 310 that was generated on smartphone 301. While transformation 320 was described in the previous example as a lower resolution digital picture, it may be in any form described above.

The transformation 320 may also allow a user the optional step of using, manipulating, or editing the transformation of the data (act 624). For example, the user may receive the lower resolution picture 320 at laptop 302 and decide to crop the photo for a specific application. Possible editing/manipulation of transformations may be of any of the types described above.

Once an edit has been made to the transformation 320 of data on the second computing system, the edited data is synced back to the first computing system (act 613). As described above, while the act of syncing is shown in FIG. 6 as being performed on the first computing system, syncing may be done by any of the computing systems in the network, either singly or in a distributed manner.

Accordingly, the principles described herein provide a mechanism for users to be able to have an appearance of data on their respective devices/systems without actually having to sync the entire data. Furthermore, once the user interacts with that appearance, if the data (or transformation thereof) has not yet been synched to the device/system in the meantime, then the syncing mechanism provides the data (or transformation thereof). Furthermore, logic rules may be applied regarding the timing of the syncing operation so as to maximize the perceived performance given the circumstances.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a first client computing system that includes one or more processors, for making at least a portion of data on the first client computing system available to at least a second client computing system, the method comprising:
    identifying a file comprising original data available at the first client computing system, and which is to be shared with one or more additional computing systems;
    generating metadata associated with the file, the metadata including (i) a derived portion of the original data, and (ii) information identifying the first client computing system as being the location of the original data of the file, the metadata being structured such that, when interpreted by the second client computing system, the second client computing system is enabled to use the derived portion of the original data to display a representation of the file as if it were actually present on the second client computing system and to request the original data of the file from the first client computing system when the representation of the file is accessed at the second client computing system;
    sending the metadata to a server computing system, the server computing system being configured to send the metadata to the second client computing system;
    receiving a request from the second client computing system for the original data, the request being received based on a user request at the second client computing system to access the representation of the file; and
    based at least on receiving the request, sending the original data to the second client computing system.

2. The method in accordance with claim 1, wherein the derived portion of the original data comprises an augmentation of the original data, the augmentation including additional data formulated through an evaluation of the original data.

3. The method in accordance with claim 2, wherein the augmentation comprises inferential data that is estimated to be true based on the evaluation of original data, but which is not certain to be true based on the evaluation of the original data.

4. The method in accordance with claim 3, wherein the inferential data comprises an estimated identification of an individual in a digital picture.

5. The method in accordance with claim 3, wherein the inferential data comprises an estimated landmark that an individual was facing when a digital picture represented by the data was taken.

6. The method in accordance with claim 1, wherein the original data comprises a digital picture.

7. The method in accordance with claim 6, wherein the derived portion of the original data comprises a thumbnail that the second client computing system is enabled to display in connection with displaying the representation of the file.

8. The method in accordance with claim 1, wherein the derived portion of the original data comprises text that is extracted from the original data, and which the second client computing system is enabled to present in connection with displaying the representation of the file.

9. A computing system, comprising:
    one or more processors; and
    one or more computer-readable storage media having stored thereon computer-executable instructions that are executable by the one or more processors to cause the computing system to access data from at least one other computing system, the computer executable instructions including instructions that are executable to cause the computing system to perform at least the following:
        receive metadata from a server computing system, the metadata having been received by the server computing system from an other computing system, the metadata including (i) a derived portion of original data of a file at the other computing system, and (ii) information identifying the other computing system as being the location of the original data of the files;
        based at least on receiving the metadata from the server computing system, use the derived portion of the original data to display the representation of the file as if it were actually present on the computing system, including displaying the derived portion of the original data with the representation of the file;
        detect a user interaction with the displayed representation of the file;
        in response to the detection of the user interaction:
            use the metadata to identify the other computing system as the location of the original data of the file; and
            request the original data of the file from the other computing system; and
        in response to the request, receive the original data of the file from the other computing system.

10. The computing system in accordance with claim 9, wherein the derived portion of the original data comprises an augmentation of the original data, the augmentation including additional data formulated through an evaluation of the original data.

11. The computing system in accordance with claim 10, wherein the augmentation comprises inferential data that is estimated to be true based on the evaluation of original data, but which is not certain to be true based on the evaluation of the original data.

12. The computing system in accordance with claim 11, wherein the inferential data comprises an estimated identification of an individual in a digital picture.

13. The computing system in accordance with claim 11, wherein the inferential data comprises an estimated landmark that an individual was facing when a digital picture represented by the data was taken.

14. The computing system in accordance with claim 9, wherein the original data comprises a digital picture, wherein the derived portion of the original data comprises a thumbnail of the picture, and wherein displaying the derived portion of the original data with the representation of the file comprises displaying the thumbnail.

15. The computing system in accordance with claim 9, wherein the derived portion of the original data comprises text that is extracted from the original data, wherein displaying the derived portion of the original data with the representation of the file comprises displaying the text.

16. The computing system in accordance with claim 9, the computer executable instructions including instructions that are executable to cause the computing system to send, to the other computing system, one or more changes made to the original data by the computing system.

17. A computing system, comprising:
one or more processors; and
one or more computer-readable storage media having stored thereon computer executable instructions that are executable by the one or more processors to cause the computing system to make at least a portion of data on the computing system available on one or more additional computing systems, the computer executable instructions including instructions that are executable to cause the computing system to perform at least the following:
identify a file comprising original data available at the computing system, and which is to be shared with at least one other computing system;
generate metadata associated with the file, the metadata including (i) a derived portion of the original data, and (ii) information identifying the computing system as being the location of the original data of the file, the metadata being structured such that, when interpreted by the other computing system, the other computing system is enabled to use the derived portion of the original data to display a representation of the file as if it were actually present on the other computing system and to request the original data of the file from the computing system when the representation of the file is accessed at the other computing system;
send the metadata to a server computing system, the server computing system being configured to send the metadata to the other computing system;
receive a request from the other computing system for the original data, the request being received based on a user request at the other computing system to access the representation of the file; and
based at least on receiving the request, send the original data to the other computing system.

18. The computing system of claim 17, wherein sending the metadata is delayed for a specified time period based on past user interaction with similar types of data.

19. The computing system of claim 18, wherein the delay comprises the average time a user takes to discard unwanted digital pictures and edit wanted digital pictures.

20. The computing system of claim 17, wherein the derived portion of the original data comprises an augmentation of the original data, the augmentation including additional data formulated through an evaluation of the original data.

* * * * *